United States Patent [19]
Matsumoto et al.

[11] 3,978,406
[45] Aug. 31, 1976

[54] CODE ERROR DETECTING SYSTEM IN DIGITAL CODE TRANSMISSION
[75] Inventors: Youichi Matsumoto; Seijiro Yokoyama; Tadao Shimamura, all of Tokyo, Japan
[73] Assignee: Nippon Electric Company, Ltd., Tokyo, Japan
[22] Filed: Aug. 11, 1975
[21] Appl. No.: 603,901

[30] Foreign Application Priority Data
Aug. 14, 1974 Japan................................ 49-93001

[52] U.S. Cl.................................. 325/41; 178/67; 340/146.1 AQ
[51] Int. Cl.²......................................... H04L 1/10
[58] Field of Search.................. 178/67, 69 R, 69 N; 325/30, 41, 42, 65; 340/146.1 A, 146.1 AQ

[56] References Cited
UNITED STATES PATENTS
3,806,647   4/1974   Dohne et al. ............. 340/146.1 AQ
3,891,959   6/1975   Tsuji et al. ............................ 178/67

Primary Examiner—Benedict V. Safourek
Attorney, Agent, or Firm—Sughrue, Rothwell, Mion, Zinn and Macpeak

[57] ABSTRACT

A code error detection system in a digital phase modulation communication system comprises on the transmitter side a first code train generator for generating a pseudo-random code train and a second code train generator for generating codes which are complementary to each other at n-bit intervals. A 4-phase phase modulator is driven by another code representative of the exclusive OR function of the pseudo-random and complementary codes.

8 Claims, 9 Drawing Figures

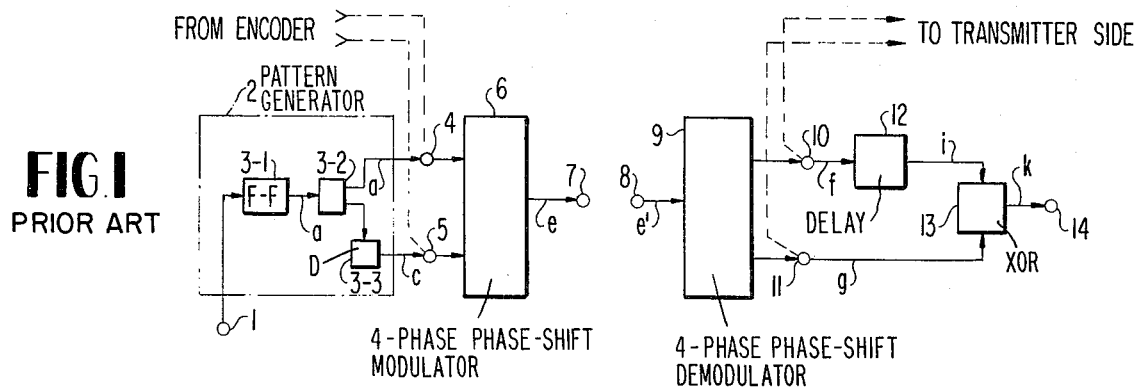
FIG.1 PRIOR ART
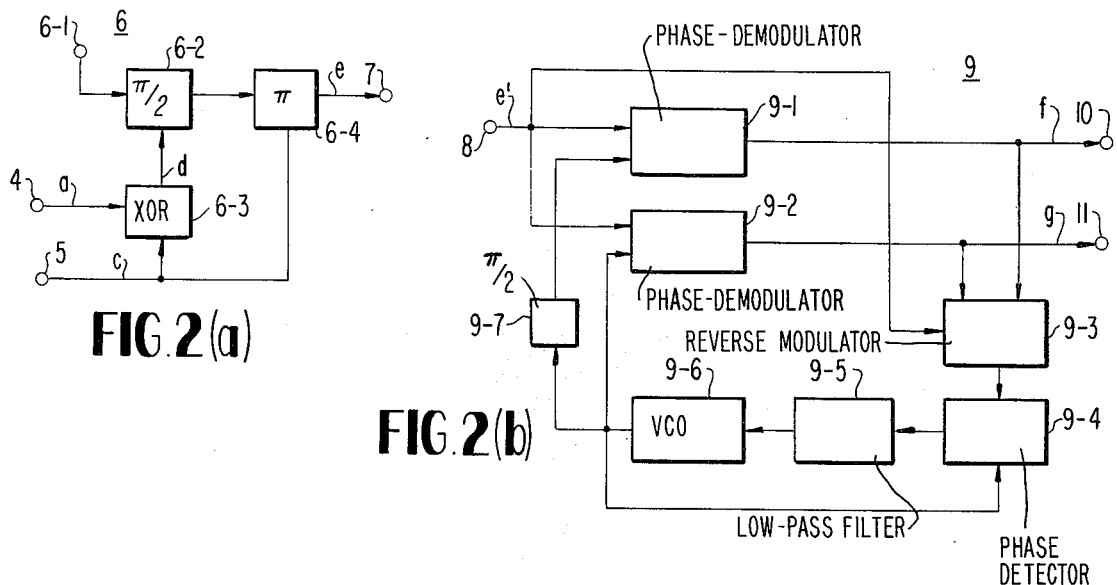
FIG.2(a)
FIG.2(b)
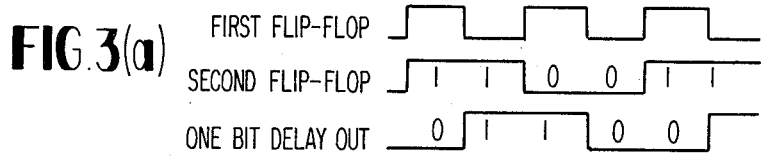
FIG.3(a)
| a | 1 | 1 | 0 | 0 | 1 | 1 | 0 | 0 | 1 | 1 | 0 | 0 | 1 | 1 | 0 | 0 |
|---|---|---|---|---|---|---|---|---|---|---|---|---|---|---|---|---|
| c | 0 | 1 | 1 | 0 | 0 | 1 | 1 | 0 | 0 | 1 | 1 | 0 | 0 | 1 | 1 | 0 |
| d | 1 | 0 | 1 | 0 | 1 | 0 | 1 | 0 | 1 | 0 | 1 | 0 | 1 | 0 | 1 | 0 |
| e | $\pi/2$ | $\pi$ | $3\pi/2$ | 0 | $\pi/2$ | $\pi$ | $3\pi/2$ | 0 | $\pi/2$ | $\pi$ | $3\pi/2$ | 0 | $\pi/2$ | $\pi$ | $3\pi/2$ | 0 |
| f | 1 | 1 | 0 | 0 | 1 | 1 | 0 | 0 | 1 | 1 | 0 | 0 | 1 | 1 | 0 | 0 |
| g | 0 | 1 | 1 | 0 | 0 | 1 | 1 | 0 | 0 | 1 | 1 | 0 | 0 | 1 | 1 | 0 |
| i | 0 | 1 | 1 | 0 | 0 | 1 | 1 | 0 | 0 | 1 | 1 | 0 | 0 | 1 | 1 | 0 |
| k | 0 | 0 | 0 | 0 | 0 | 0 | 0 | 0 | 0 | 0 | 0 | 0 | 0 | 0 | 0 | 0 |
FIG.3(b)

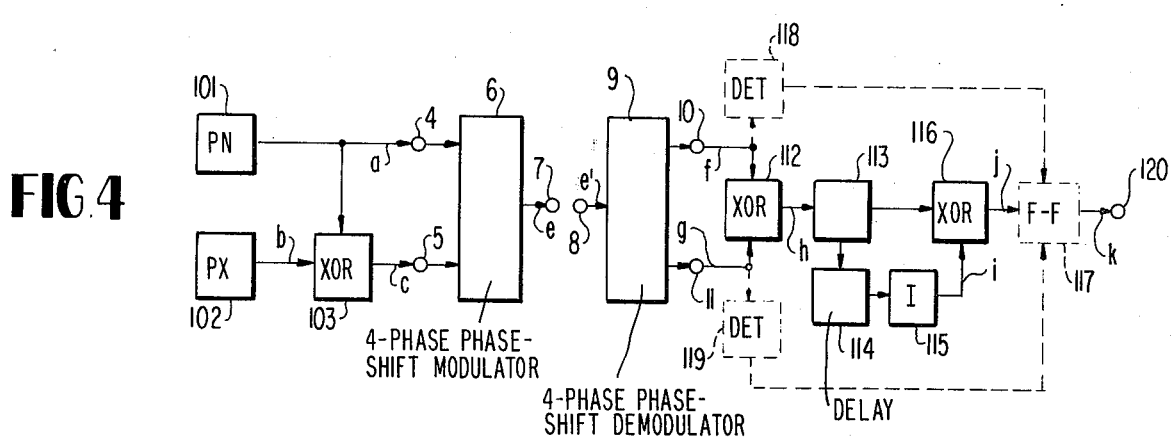
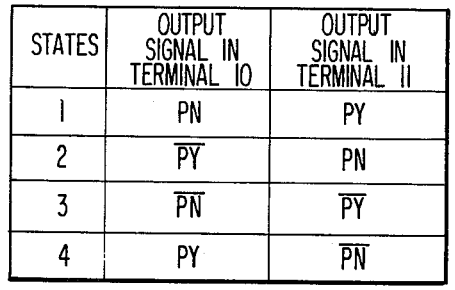
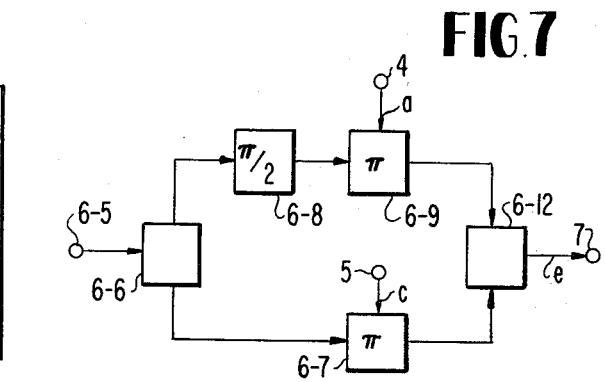

CODE ERROR DETECTING SYSTEM IN DIGITAL CODE TRANSMISSION

BACKGROUND OF THE INVENTION

The present invention relates to a code error detecting system capable of detecting a line fault of a relay section in a wireless digital relay transmission system using a digital code phase-modulation system.

In the wireless transmission of digital signals, it is often the practice to cause the digital signals to 4-phase phase-modulate a radio frequency carrier wave for transmission. The transmitted carrier wave is demodulated by coherent detection on the receiver side. When the carrier wave is in the millimeter or the quasi-millimeter wave region, the channel capacity per carrier wave frequency is much greater than in the conventional microwave transmission system. If a carrier wave of one frequency is driven out of order, therefore, a great number of communication channels are affected all at the same time. In addition, in a long haul relay transmission system, it is always a time-consuming process to locate the affected one among many relay sections. One prior art method of the fault detection and location has employed a repetition of a simple code pattern represented by the phase modulation of carrier wave which is transmitted every time the transmission line is out of order. For example, the code-representing sequence of phases O, $\pi$, O, $\pi$ . . . , or O, $\pi/2$, $\pi$, $3\pi/2$, O, $\pi/2$ . . . are transmitted in place of the information signal. The code pattern is detected to enable the error detection at each relay section by utilizing self-correlation. However, when the 4-phase phase-modulator to be employed for the transmission of the information signal at the transmitter side is composed of a series combination of a $\pi/2$ phase-modulator and a $\pi$ phase-modulator in each relay section, a line fault ascribed to a fault with the $\pi/2$ phase-modulator cannot be detected during the transmission of the phase-modulated carrier wave taking the phase values O, $\pi$, O, $\pi$ . . . because this phase-shift modulation is not in phase with of the $\pi/2$ phase-modulator. While, when the phase-modulated carrier wave successively takes the phase values O, $\pi/2$, $\pi$, $3\pi/2$, O, $\pi/2$ . . . representative of the fault-detection code pattern, a fault with the $\pi/2$ phase-modulator can be detected. In this operation, the change in the phase of the phase-modulated carrier wave is in either the forward or the backward direction, with the repetition rate being set as short as 4 bits. The phase-modulated carrier wave has a spectrum of frequency components distributed by a frequency deviation of Nfc/4, where fc stand for a clock frequency; and N, a positive integer. Consequently, when such a carrier wave received at the receiver side is demodulated, a DC component is inevitably present in the phase-detected output of a carrier wave reproducer circuit employed in the phase-demodulator, so that the reproduction of the carrier wave for phase demodulation is disturbed. This gives rise to the so-called pseudo lock-in phenomenon in which the carrier wave reproducer circuit stays synchronized at a frequency deviated from the input carrier wave frequency.

SUMMARY OF THE INVENTION

It is therefore an object of the invention to provide a code error detecting system capable of the in-operation detection of a line fault of the relay section in a relay transmission system which is perfectly free of the above-mentioned pseudo lock-in phenomenon.

According to the present invention, there is provided a code error detecting system in which the transmitter side comprises a first code train generator for generating a pseudo-random (PN) code train and a second code train generator for generating codes complementary to each other at $n$-bit intervals (PX code) such as 1, 0, 1, 0 . . . (where $n = 1$) or 1, 1, 0, 0, 1, 1 . . . (where $n = 2$). The 4-phase phase modulator is driven by another code (or PY code) representative of the exclusive OR function of the PN and PX codes. This arrangement permits both the positive and negative phase shifts of the modulated phase to occur equally at a probability of ½, and the repetition rate to become twice the period of the PN code used. As a result, the DC component appearing in the currier wave reproducer circuit is markedly reduced and the pseudo lock-in phenomenon is eliminated. Furthermore, because the modulating pulse code is applied to all the modulators, it becomes readily possible to detect a fault with the 4-phase phase-modulator by detecting a code error pulse from the phase-demodulated signal received on the receiver side.

BRIEF DESCRIPTION OF THE DRAWINGS

The other objects, features and advantages of the invention will become more apparent from the following description taken in conjunction with the accompanying drawings.

FIG. 1 is a block diagram showing a prior art code error detecting system,

FIGS. 2a and 2b are block diagrams showing a 4-phase phase-modulator on the transmitter side and a 4-phase phase-demodulator on the receiver side, respectively, in a radio relay system, FIGS. 3a and 3b are code charts for illustrating the operation of the code error detecting system shown in FIG. 1, FIG. 4 is a block diagram showing a code error detecting system of one embodiment of the invention, FIG. 5 is a chart showing states of signals at the output of the 4-phase phase-demodulator, FIG. 6 is a code chart for illustrating the operation of the code error detecting system shown in FIG. 4, and FIG. 7 is a block diagram showing another example of transmitter side 4-phase phase-modulator used in radio relay system.

DESCRIPTION OF THE PREFERRED EMBODIMENT

With reference to FIG. 1, there is shown in block form a prior art code error detecting system, which comprises a 4-phase phase-shift modulator 6 on the transmitter side and a 4-phase phase-shift demodulator 9 on the receiver side installed in each relay section of a radio relay system. Whether a code error is caused in a relay section is determined in the following manner. On the transmitter side, the coded information signal from an encoder is disconnected by a switching means (not shown) from input terminals 4 and 5 of the 4-phase phase-shift modulator 6. In its place, a pattern generator 2 is connected to terminals 4 and 5. The pattern generator 2 is composed of a two-stage flip-flop circuit 3–1, a branching circuit 3–2 and a one-bit delay circuit 3—3. In this pattern generator 2, the flip-flop circuit 3–1 counts down a clock pulse supplied through a terminal 1 to produce another pulse train $a$ having an interval four times as large as the clock interval. Then, its output is branched into two by the branching circuit 3-2, one being directly led to the terminal 4 and the other to the one-bit delay circuit 3—3 and then to the terminal 5.

The operation of this pattern generator will now be described referring to the waveform diagram of FIG. 3a. The undelayed and delayed pulses at terminals 4 and 5 are then supplied to the 4-phase phase-shift modulator 6.

At the receiving end, the modulated carrier wave is received at an input terminal 8 and supplied to a 4-phase phase-demodulator 9, whose output at terminals 10 and 11 are ordinarily coupled to the transmitter for the next section of the relay system. For fault detection, the transmitter for the next relay section is disconnected by a switching means (not shown) from the output terminals 10 and 11 of the 4-phase phase-demodulator 9. In its place, a code error detecting circuit composed of a one-bit delay circuit 12 and an exclusive OR circuit 13 is connected as shown in FIG. 1. The output of the exclusive OR circuit 13 constitutes a code error detection signal as described hereinafter.

A typical example of the 4-phase phase-shift modulator 6 is shown in FIG. 2a. As shown, it comprises a $\pi/2$ phase-shift modulator 6-2 and a $\pi$ phase-shift modulator 6-4, which are connected in series between an input terminal 6-1 and an output terminal 7. A carrier wave in the millimeter wave region is applied to the terminal 6-1 while the undelayed and delayed binary pulse pair is applied as the modulating signals input to the terminal pair 4 and 5. The code signal incoming at the terminal 5 drives directly the $\pi$ phase-shift modulator 6-4, and that applied to the terminal 4 is supplied together with the signal from the terminal 5 to an exclusive OR circuit 6-3. The exclusive OR function modulates the $\pi/2$ phase-shift modulator 6-2. Thus the paired pulses $a$ and $c$ are converted into a code train $d$ by the exclusive OR circuit 6-3 to drive the $\pi/2$ phase-modulator 6-2, and the code train $c$ drives the $\pi$ phase-modulator 6-4 whereby an output phase-modulated wave $e$ of the carrier wave is obtained at the output terminal 7. There are relationships between these code trains as shown in FIG. 3b.

Referring to FIG. 2b showing a typical example of 4-phase phase-demodulator 9, two phase-demodulators 9-1 and 9-2 are provided to demodulate the binary two-row signals from a 4-phase phase-modulated carrier wave received at an input terminal 8. The demodulated two-row signals go to the output terminals 10 and 11, as well as to a reverse modulator 9-3, in which the carrier wave applied to its input is reversely modulated into a unmodulated carrier wave. This unmodulated carrier wave is applied to a carrier wave reproducer circuit constituted of a phase-locked loop comprising a phase detector 9-4, a low-pass filter 9-5 and a voltage-controlled oscillator 9-6. A pure unmodulated carrier wave synchronized with the received input carrier wave is reproduced from the output of the voltage-controlled oscillator 9-6. This reproduced carrier wave is branched to the phase-demodulator 9-1 through a $\pi/2$ phase shifter 9-7 and to the phase-demodulator 9-2 directly so as to perform the $\pi$ and $\pi/2$ phase-demodulations, respectively.

As described, the 4-phase phase-modulated carrier wave from the terminal 7 is applied to the input terminal 8 of the 4-phase phase-demodulator 9. Then, the demodulated signals are derived from the 4-phase phase-demodulator 9 to the output terminals 10 and 11. Thus code trains $f$ and $g$ as in FIG. 3b appear at the output terminals 10 and 11 respectively. The code train $f$ is delayed by one bit interval by the one bit delay circuit 12, A code train $k$ is obtained from the delayed code train $i$ and the code train $g$ by an exclusive OR circuit 13. This code train $k$ is the code error detecting signal.

In this conventional system, as described, the phase angle of the transmitted phase-modulated wave is shifted always in the positive direction as 0, $\pi/2$, $\pi$, $3\pi/2$, 0, $\pi/2$, $\pi$, $3\pi/2$ ... which is repeated at as short a cycle as 4 bits, with the result that the input carrier wave has a spectrum frequency component distributed by the frequency deviation Nfc/4 where fc is a clock frequency, and N, a positive integer. Hence, in the carrier wave reproducer circuit as shown in FIG. 2b, the number of the value N with which the oscillation frequency of the voltage-controlled oscillator 9-6 in the state of free oscillation is liable to be locked is automatically selected due to the DC component developed on the side of output of the phase detector 9-4. Consequently, the voltage-controlled oscillator 9-6 maintains synchronism at a frequency shifted from the input carrier frequency by the value Nfc/4. Because of this pseudo lock-in phenomenon caused by the oscillator 9-6, it is impossible to establish accurate demodulation on the receiver side. Furthermore, because the pattern of phase shifts of the phase-modulated wave in an actual operating state is random unlike the one described above, it is hardly feasible for prior art systems to accurately detect any fault in a relay section of a radio relay system in operation.

With reference to FIG. 4, there is shown in block form a code error detecting system of the invention which, on the transmitter side, comprises a PN signal generator 101 for generating a signal of pseudo random code train PN, a PX signal generator 102 for generating a train of code signals PX complementary to each other at intervals of $n$-bit, and an exclusive OR circuit 103 for performing exclusive OR logic on the code trains PN and PX. The output code train PY of the exclusive OR circuit 103 is the exclusive OR function of PN and PX, i.e., PY = PN ⊕ PX. The PN output of the PN signal generator 101 and the PY output of the exclusive OR circuit 103 are applied to input terminals 4 and 5 to drive a 4-phase phase-modulator 6 which in turn generates a 4-phase phase-modulated carrier wave from its output terminal 7. On the receiver side, the 4-phase phase-modulated carrier wave is applied to an input terminal 8 and demodulated by a 4phase phase-demodulator 9. Because the phase angle shifted from the reference carrier wave assumes four states, 0, $\pi/2$, $\pi$, and $3\pi/2$, four different signals as shown in FIG. 5 are available at binary two-row demodulated-signal output terminals 10 and 11. In FIG. 5, $\overline{PN}$ and $\overline{PY}$ denote inverted PN and PY signals, respectively. Two trains of signals available at the output terminals 10 and 11 are applied to an exclusive OR circuit 112. The resultant logic outputs are given by following equations:

1. $PN \oplus PY = PX$

2. $\overline{PY} \oplus PN = \overline{PX}$

3. $\overline{PN} \oplus \overline{PY} = PX$

4. $PY \oplus \overline{PN} = \overline{PX}$ where $\overline{PX}$ denotes the inverted $PX$ signal. Thus a code error in a relay section can be detected by detecting a code error in the signals $PX$ and $\overline{PX}$. As described above, the system of the invention uses for its $PX$ signal a train of codes complementary to each other at intervals of $n$-bit, such as 1, 0, 1, 0 ... or 1, 1, 0, 0, 1, 1, 0, 0 ... Hence the $PX$ signal is exactly the same as the $\overline{PX}$ signal of which the phase is shifted by $n$-bits, to make it possible to simplify the code error detecting circuit.

Using for its PN signal an M-series PN codes provided by three stages of shift registers, and for its PX signal a train of codes 1, 0, 1, 0 ... (where $n = 1$), the operation of the system shown in FIG. 4 will be described by referring to a signal chart shown in FIG. 6. The code train $a$ represents the output signal PN of the PN signal generator 101 and also the signal to a pulse input terminal 4 of the 4-phase phase-modulator 6; the code train $b$, the output signal PX of the PX signal generator 102; and the code train $c$, the output signal PY of the exclusive OR circuit 103 and also the signal to a pulse input terminal 5 of the phase modulator 6. When the phase-modulator circuit is the 4-phase phase-modulator as shown in FIG. 2a, logic is applied to the signals of input terminals 4 and 5 by the exclusive OR circuit 6–3, and the resultant output signal $d$ is used to drive the $\pi/2$ phase-modulator 6–2 whereby the carrier wave from the terminal 6–1 is $\pi/2$-phase-modulated. The output of the phase modulator 6–2 is supplied to the $\pi$ phase-modulator 6–4 and $\pi$-phase-modulated by the signal PY which is from the terminal 5. As a result, a 4-phase phase-modulated output $e$ is made available at the terminal 7. This output is of $\pi/2$, $\pi$, $\pi/2$, 0, $3\pi/2$, $\pi$ ... as indicated by the code train $e$ in FIG. 6, where the individual phases occur at a probability of about ¼, and phase shift takes place on both the positive and negative directions at a probability of about ½ each. The 4-phase phase-modulated signal $e$ is demodulated by the 4-phase phase-demodulator 9 on the receiver side, thus making code trains $f$ and $g$ available at the output terminals 10 and 11. The two demodulated signals $f$ and $g$ undergo exclusive OR logic by an exclusive OR circuit 112 which in turn generates an output code train $h$. This signal train $h$ is branched into two by a branch circuit 113; one signal to an exclusive OR circuit 116 by way of an $n$-bit delay circuit 114 and a polarity inverter 115, and the other to the exclusive OR circuit 116 directly. The output of the circuit 116 is an error pulse code train $j$. The polarity inverter 115 is used for judging an error when the output of the exclusive OR circuit 116 stands at 1 level. The polarity inverter 115 is not needed for operation where a 0 level output of the circuit 116 is considered as an error. In this embodiment where a code train 1, 0, 1, 0 ... is used for the PX signal, a one-bit delay circuit is used to serve as the $n$-bit delay circuit 114.

The code error detecting system as described above is able to detect a code error ascribed to a fault with the $\pi/2$ phase-modulator 6–2 of the 4-phase phase-modulator 6 of FIG. 2a and not able to detect a code error ascribed to a fault with the $\pi$ phase-modulator 6–4. More specifically, as shown by $d$ in FIG. 6, the input signal to the $\pi/2$ phase-modulator is the same as the output PX of the PX signal generator 102. Hence, if the $\pi$ phase-modulator on the transmitter side is inoperative, the PX signal and all 1's code train, the $\overline{PX}$ signal and all 1's code train, the $\overline{PX}$ signal and all 0's code train, or the PX signal and all 0's code train are generated at the output terminals 10 and 11, respectively. Accordingly, the output $h$ of the exclusive OR circuit 112 is of PX or $\overline{PX}$ signal where no code error is detected. To solve this problem, the invention provides the following arrangement. Mark rate detecting circuits 118 and 119 which operate by the output of the 4-phase phase-demodulator 9 on the receiver side are respectively connected at the terminals 10 and 11. These mark rate detecting circuits are composed of an integrator and a level detector. Also, a flip-flop circuit 117 is connected to the output of the exclusive OR circuit 116. The circuit 117 is set by the outputs of the mark rate detecting circuits 118 and 119 whereby an error detecting signal is derived from the output terminal 120. When one of the input signals $f$ and $g$ to the mark rate detecting circuits 118 and 119 is all 1's or all 0's, the output of the circuit 117 is set into an error state by the output of the one of the mark rate detecting circuits from which either all 1's or all 0's signal has to be derived. When no code error is present, an all 0's code train $k$ is detected at the output terminal 120.

The 4-phase phase-modulator used on the transmitter side is often of the construction comprising a series combination of a $\pi/2$ phase-modulator and a $\pi$ phase-modulator as shown in FIG. 2a. Instead, as shown in FIG. 7, the 4-phase phase-modulator may be constituted for two $\pi$ phase-modulators which are driven in parallel. This 4-phase phase-modulator is functionally identical to the former, excepting that the latter gives rise to a power loss of 3 dB in the carrier wave combiner circuit. This 4-phase phase-modulator is such that, in FIG. 7, the carrier wave from a terminal 6–5 is branched into two by a branch circuit 6—6; one component is phase-shifted by a $\pi/2$ phase shifter 6–8 and supplied to a $\pi$ phase-modulator 6–9, and the other is supplied to a $\pi$ phase-modulator 6–7. These phase-modulators 6–9 and 6–7 are driven by the signals from terminals 4 and 5 respectively, and the resultant modulated outputs are combined by a carrier wave combiner 6–12 into an output, which is available at the output terminal 7. When this type of 4-phase phase-modulator is used on the transmitter side of each relay station, i.e., as the phase modulator 6 of FIG. 4, the two $\pi$ phase-modulators are driven independently by the modulation signals $a$ and $c$ and hence the mark rate detecting circuits 118 and 119 and the flip-flop circuit 117 can be dispensed with.

According to the invention, as has been described above, a fault with either the $\pi/2$ phase-modulator or the $\pi$ phase-modulator of the 4-phase phase-modulator on the transmitter side can readily be detected. Phase modulation of the carrier wave occurs at a probability of about ¼, equally for the phases 0, $\pi/2$, $\pi$, and $3\pi/2$, and the repetition rate of the modulated phase is twice the repetition rate of the PN code used on the transmitter side, with the result that the randomness of PN code increases. Furthermore, because phase shift occurs at a probability of about ½ in both the forward and backward directions, the DC component developed in the phase-detected output of the carrier wave reproducer circuit is markedly reduced. This at the same time eliminates the pseudo lock-in phenomenon where the carrier wave reproducer circuit synchronizes with a different carrier frequency. Still further, the code error detecting circuit can be simplified despite the fact that the PN signal of long repetition cycle is used as the modulation signal on the transmitter side.

While one preferred embodiment of the invention and specific modifications thereof have been described in detail, it is to be understood that numerous variations may occur to those skilled in the art without departing from the true spirit of the invention.

What is claimed is:

1. In a digital phase modulation communication system adapted to transmit information signals from a transmitting end to a receiving end through the 4-phase phase-modulation of a high-frequency carrier wave, said communication system including a 4-phase phase-modulating means at said transmitting end and having first and second inputs for receiving encoder outputs to modulate said carrier wave and means having first and second outputs at said receiving end for demodulating the transmitted 4-phase phase-modulated carrier wave and converting it into a binary signal pair at said first and second outputs, a code error detecting system comprising:

means at said transmitting end for generating an output train of pseudo-random code patterns, said output train of pseudo-random code patterns being supplied to said first input of said modulating means, means at said transmitting end for generating an output train of complementary code patterns which are complementary to each other at intervals of $n$-bits where $n$ is a positive integer, a first exclusive OR circuit at said transmitting end connected to receive said output train of pseudo-random code patterns and said output train of complementary code patterns and supplying an exclusive OR function of said output trains to said second input of said modulating means, a second exclusive OR circuit at said receiving end connected to receive said binary signal pair at said first and second output of said demodulating means and providing an exclusive OR function of said binary signal pair, delay means at said receiving end connected to the output of said second exclusive OR circuit for providing an $n$-bit delayed exclusive OR function of said binary signal pair, and a third exclusive OR circuit at said receiving end connected to receive the output of said second exclusive OR circuit and said delay means and providing an output error pulse code train.

2. The code error detecting system as recited in claim 1 further comprising inverter means at said receiving end connected between said delay means and said third exclusive OR circuit.

3. The code error detecting system as recited in claim 1 further comprising:

a first mark rate detecting means at said receiving end connected to said first output of said demodulating means for detecting the mark rate of one of said demodulated binary signal pair, a second mark rate detecting circuit at said receiving end connected to said second output of said demodulating means for detecting the mark rate of the other of said demodulated binary signal pair, and bistable circuit means responsive to the output of at least one of said first and second mark rate detecting means for rendering the output of said third exclusive OR circuit into an error state when the output of one of said first or second mark rate detecting means is all binary 1's or all binary 0's.

4. A digital phase modulation communication system adapted to transmit information signals from a transmitting end to a receiving end through the 4-phase phase-modulating of a high-frequency carrier wave, said communication system comprising:

a 4-phase phase-modulating means at the said transmitting end and having first and second inputs for receiving encoder outputs to modulate said carrier wave, means at said transmitting end for generating an output train of pseudo-random code patterns, said output train of pseudo-random code patterns being supplied to said first input of said modulating means, means at said transmitting end for generating an output train of complementary code patterns which are complementary to each other at intervals of $n$-bits where $n$ is a positive integer, a first exclusive OR circuit at said transmitting end connected to receive said output train of pseudo-random code patterns and said output train of complementary code patterns and supplying an exclusive OR function of said output trains to said second input of said modulating means, means having first and second outputs at said receiving end for demodulating the transmitted 4-phase phase-modulated carrier wave and converting it into a binary signal pair at said first and second outputs, a second exclusive OR circuit at said receiving end connected to receive said binary signal pair at said first and second outputs of said demodulating means and providing an exclusive OR function of said binary signal pair, delay means at said receiving end connected to the output of said second exclusive OR circuit for providing an $n$-bit delayed exclusive OR function of said binary signal pair, and a third exclusive OR circuit at said receiving end connected to receive the outputs of said second exclusive OR circuit and said delay means and providing an output error pulse code train.

5. A digital phase modulation communication system as recited in claim 4 further comprising an inverter at said receiving end connected between said delay means and said third exclusive OR circuit.

6. A digital phase modulation communication system as recited in claim 4 wherein said modulating means comprises:

first phase-modulator means connected to receive said high-frequency carrier wave and a modulating input signal for $\pi/2$-phase-modulating said carrier wave in response to said modulating input signal, second phase-modulator means connected to receive the output of said first phase-modulator means and the output of said first exclusive OR circuit for $\pi$-phase-modulating the output of said first phase-modulator means in response to the output of said first exclusive OR circuit, and a fourth exclusive OR circuit connected to receive as inputs the output of said first exclusive OR circuit and the output of said pseudo-random code generating means and producing the modulating input signal to said first modulator means.

7. The digital phase code modulation communication system recited in claim 6 further comprising:

first mark rate detecting means at said receiving end connected to said first output of said demodulating means for detecting the mark rate of one of said demodulated binary signal pair, second mark rate detecting means at said receiving end connected to said second output of said demodulating means for detecting the mark rate of the other of said demodulated binary signal pair, and bistable circuit means responsive to the output of at least of one of said first and second mark rate detecting means for rendering the output of said third exclusive OR circuit into an error rate when the output of one of said first or second mark rate detecting means is all binary 1's or all binary 0's.

8. A digital phase modulation communication system as recited in claim 4 wherein said modulating means comprises:

phase shift means connected to receive said high-frequency carrier wave for $\pi/2$-phase shifting said carrier wave, first modulator means connected to receive as inputs the output of said phase shifting means and the output of said pseudo-random code generating means for $\pi$-phase-modulating the output of said phase shifting means in response to the output of said pseudo-random code generating means, second phase modulator means connected to receive as inputs said high-frequency carrier wave and the output of said first exclusive OR circuit for $\pi$-phase-modulating said carrier wave in response to the output of said first exclusive OR circuit, and means for combining the outputs of said first and second phase modulator means.

* * * * *